US010061692B1

(12) United States Patent
Nicklin et al.

(10) Patent No.: US 10,061,692 B1
(45) Date of Patent: Aug. 28, 2018

(54) METHOD AND SYSTEM FOR AUTOMATED STORAGE PROVISIONING

(71) Applicant: EMC Corporation, Hopkinton, MA (US)

(72) Inventors: Shawn R. Nicklin, Dieppe (CA); Brent J. Rhymes, Prosper, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 137 days.

(21) Appl. No.: 13/891,415

(22) Filed: May 10, 2013

Related U.S. Application Data

(60) Provisional application No. 61/645,519, filed on May 10, 2012.

(51) Int. Cl.
G06F 12/02 (2006.01)
G06F 3/06 (2006.01)

(52) U.S. Cl.
CPC ........... G06F 12/023 (2013.01); G06F 3/067 (2013.01); G06F 3/0631 (2013.01); G06F 12/02 (2013.01)

(58) Field of Classification Search
CPC ........ G06F 3/067; G06F 12/02; G06F 12/023; G06F 3/0631

USPC .......................................... 711/170
See application file for complete search history.

(56) References Cited

U.S. PATENT DOCUMENTS

| 7,539,824 | B2 * | 5/2009 | Lolayekar et al. ........... 711/148 |
| 7,930,476 | B1 * | 4/2011 | Castelli et al. ............... 711/114 |
| 8,082,330 | B1 * | 12/2011 | Castelli ................. G06F 9/5016 709/220 |
| 8,095,764 | B1 * | 1/2012 | Bauer et al. .................. 711/170 |
| 8,151,048 | B1 * | 4/2012 | Premkumar et al. ......... 711/114 |
| 8,255,803 | B1 * | 8/2012 | McAdam et al. ............ 715/735 |
| 8,473,678 | B1 * | 6/2013 | Rajasekaran et al. ........ 711/114 |
| 2004/0243692 | A1 * | 12/2004 | Arnold .................. G06F 9/5016 709/220 |
| 2006/0075191 | A1 * | 4/2006 | Lolayekar ............. G06F 3/0613 711/114 |
| 2009/0320033 | A1 * | 12/2009 | Gokhale et al. .............. 718/103 |

* cited by examiner

Primary Examiner — Than Nguyen
(74) Attorney, Agent, or Firm — Ryan, Mason & Lewis, LLP

(57) ABSTRACT

Example embodiments of the present invention include a method, a system, and a computer-program product for storage automation. The method includes receiving a request for storage, determining a storage allocation for provisioning according to the request for storage and available storage resources, and provisioning storage according to the determined storage allocation.

21 Claims, 6 Drawing Sheets

METHOD AND SYSTEM FOR AUTOMATED STORAGE PROVISIONING

CROSS REFERENCE TO RELATED APPLICATION

This Application claims the benefit of U.S. Provisional Patent Application Ser. No. 61/645,519 entitled "DATA STORAGE ACCESS METHOD AND SYSTEM" filed on May 10, 2012, the teachings of which application are hereby incorporated herein by reference in their entirety.

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", Ser. No. 13/631,214 entitled "AUTOMATED POLICY BASED SCHEDULING AND PLACEMENT OF STORAGE RESOURCES", and Ser. No. 13/631,246 entitled "DISTRIBUTED SYSTEM SOFTWARE INFRASTRUCTURE", filed on Sep. 28, 2012; and Ser. No. 13/886,644 entitled "STORAGE PROVISIONING IN A DATA STORAGE ENVIRONMENT", Ser. No. 13/886,687 entitled "STORAGE PROVISIONING IN A DATA STORAGE ENVIRONMENT", Ser. No. 13/886,786 entitled "DISTRIBUTED WORKFLOW MANAGER", Ser. No. 13/886,789 entitled "PORT PROVISIONING SYSTEM", Ser. No. 13/886,892 entitled "SCALABLE INDEX STORE", and Ser. No. 13/886,915 entitled "SCALABLE OBJECT STORE", and filed on even date herewith, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to data storage and access and more particularly, but not by way of limitation, to systems and methods for automated storage provisioning.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligence and communications electronics and software for making the data on the disks available. To leverage the value of MSS, these are typically networked in some fashion.

Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

Each network type has its advantages and disadvantages, but SANs are particularly noted for providing the advantage of being reliable, maintainable, and being a scalable infrastructure, but their complexity and disparate nature make them difficult to centrally manage. Thus, a problem encountered in the implementation of SANs is that the dispersion of resources tends to create an unwieldy and complicated data storage environment. Reducing the complexity by allowing unified management of the environment instead of treating it as a disparate entity would be advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

Storage Administrators, the individuals responsible for managing and safeguarding information, such as that stored on Storage Area Networks (SANs), currently are unable to manage the explosion in demand for computer storage using traditional storage administration tools. Typical tasks that Storage Administrator's perform in order to support this explosion in new data include Storage Provisioning (i.e., the allocation of new storage on storage equipment and then "assigning" that storage to users), Storage Reclamation (i.e., the identification and repurposing (e.g., deletion) of unused or underutilized storage so that it can be returned to the pool of available storage for reuse), and Storage Remediation (i.e., the identification and resolution of issues (e.g., errors) that occur within a storage environment).

Current processes for storage administration are manual and labor intensive. Today, Storage Administrators typically use a combination of manual processes and single-use, administration tools and scripts to perform the necessary tasks.

SUMMARY

Example embodiments of the present invention include a method, a system, and a computer-program product for storage automation. The method includes receiving a request for storage, determining a storage allocation for provisioning according to the request for storage and available storage resources, and provisioning storage according to the determined storage allocation.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
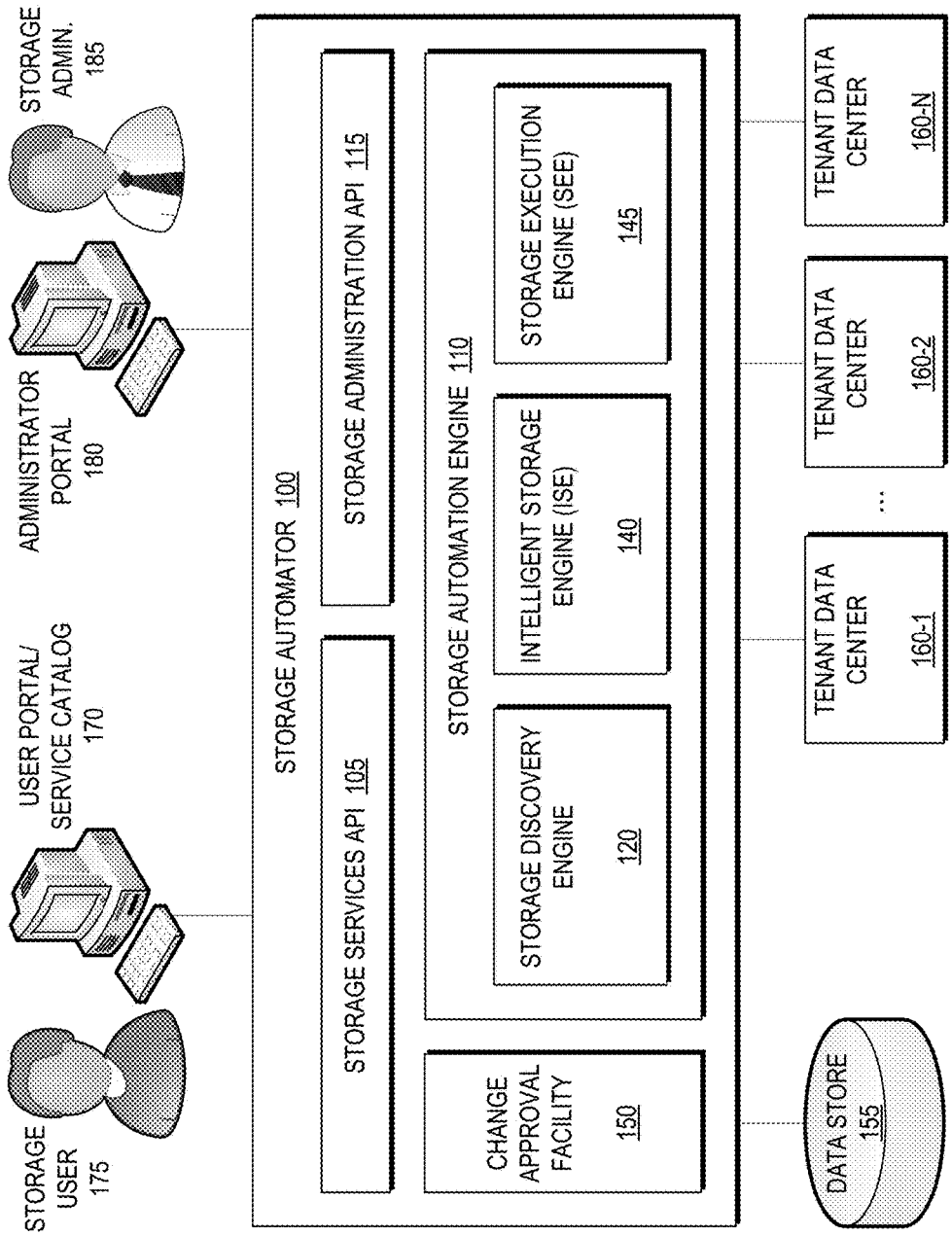
FIG. 1 is a block diagram illustrating a storage automator according to an example embodiment of the present invention.

FIG. 1 is a block diagram providing a technical overview of an exemplary Storage Automator 100 according to an example embodiment of the present invention. In various embodiments, a Storage Automator 100 can significantly accelerate the time for storage administrative tasks. As illustrated in FIG. 1, the Storage Automator 100 may include a Storage Services Application Programming Interface (API) 105, a Storage Administration API 115, and a Storage Automation Engine 110. Additionally, certain embodiments may include a Change Approval Facility 150. FIG. 1 may be studied in conjunction with the flow diagrams of FIGS. 2-10 which illustrate methods according to example embodiments of the present invention.

In various embodiments, the Storage Automation Engine 110 may include a Storage Discovery Engine 120, an Intelligent Storage Engine (ISE) 140, and a Storage Execution Engine (SEE) 145.

In certain embodiments, the Storage Discovery Engine 120 may discover storage resources that reside in one or more tenant data centers 160-1-160-N (160, generally), for example, storage arrays, storage network equipment, and storage hosts (i.e., computers that attach to and use storage). Further, the Storage Discovery Engine 120 may inspect storage arrays and automatically classify the device groups (e.g., RAID Groups or Storage Pools) of an array into Storage Tiers based on, for example, the physical attributes of the devices.

The Storage Discovery Engine 120 may store discovered information about the storage resources in a Storage Database (e.g., Data Store 155). The Data Store 155 may store information on, for example, the storage arrays, network devices, and network equipment discovered by the Storage Discovery Engine 120 as well as the configuration information of the Storage Automator 100. In certain embodiments, the Data Store 155 may maintain the relationship information of the various storage devices (i.e., the storage "topology") that reside within a data center (e.g., tenant data centers 160).

Figure 2:
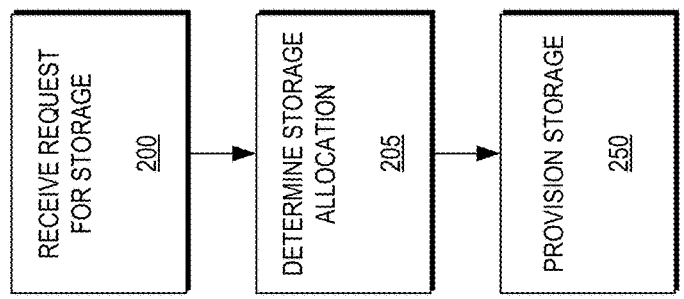

As illustrated in FIGS. 1 and 2, the Storage Automator 100 may receive a request for storage (200), such as from a Storage User 175 via a User Portal 170 presented by the Storage Services API 105. In certain embodiments, the User Portal 170 may be a web-based application that Storage Users 175 can access to submit a request for storage. Storage Users 175 may select, via the User Portal 170, from a menu of services presented by a Service Catalog 170. For example, a Storage User 175 can order "100 TB of 'Gold' Storage for a Windows PC" according to various service level agreements (SLAs) presented in the Service Catalog via the User Portal 170.

Figure 3:
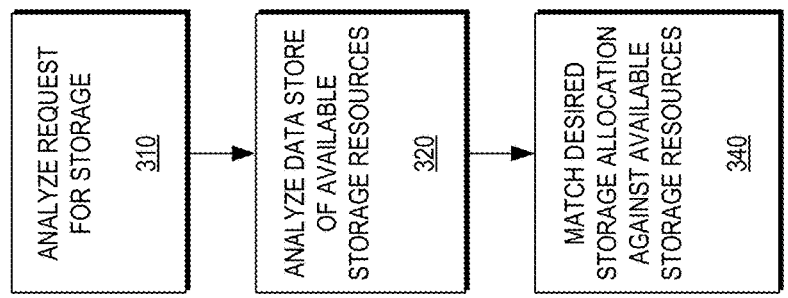

The Storage Automator 100 then may determine a storage allocation for provisioning (205) according to the request for storage and available storage resources. For example, as illustrated in FIGS. 1 and 3, the Intelligent Storage Engine (ISE) 140 may be a rules database configured to evaluate or analyze the request for storage (310) to determine a desired storage allocation satisfying the request for storage. The ISE 140 then may analyze the Data Store 155 including information defining the available storage resources (320) (i.e., the storage that has been discovered by the Storage Discovery Engine 120).

In example embodiments, the ISE 140 uses a rules engine, a set of rules, and a scoring algorithm to determine which storage, out of a potential pool of, for example, 100,000s of storage devices, will best satisfy a Storage User's 175 request for storage to support, for example, an application (e.g., a software program that the user utilizes or an operating system such as Linux, Microsoft Windows or VMware HyperV).

Figure 4:
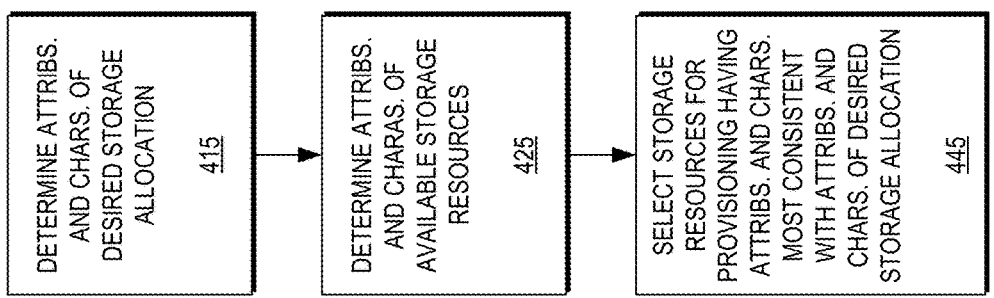

In certain embodiments, as illustrated in FIGS. 1 and 4, the ISE 140 may analyze the request for storage to determine a desired storage allocation satisfying the request for storage by determining attributes and characteristics of the desired storage allocation (415) satisfying the request for storage. Similarly, the ISE 140 may analyze the Data Store 155 including information defining the available storage resources by determining attributes and characteristics of the available storage resources defined in the Data Store 155 (425).

Returning to FIGS. 1 and 3, the ISE 140 may then find the best match possible between the Storage User's 175 storage requirements and the storage resources available. For example, the ISE 140 may match the desired storage allocation satisfying the request against the available storage resources (340). In other words, as illustrated in FIGS. 1 and 4, the ISE 140 may select storage resources for provisioning having attributes and characteristics most consistent with the attributes and characteristics of the desired storage allocation satisfying the request for storage (445).

Figure 5:
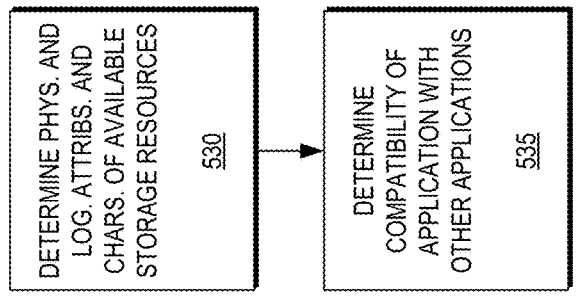
FIGS. 2-9 are flow diagrams illustrating methods according to example embodiments of the present invention.

As illustrated in FIGS. 1 and 5, in certain embodiments, the ISE 140 may determine attributes and characteristics of the available storage resources defined in the Data Store 155 by determining physical and logical attributes and characteristics of the available storage resources (530). When determining which storage will best satisfy a Storage User's request, the ISE 140 may take into account the storage requirements of an application, the physical and logical attributes of the storage devices, as defined in a Storage Resource Profile, and the compatibility of the application with other applications that are currently using the storage resources. The ISE 140 typically uses criteria, as defined in an Application Storage Profile, to determine the optimal match between an application's storage requirements and the best available storage. Examples of such criteria are presented below.

An Application Storage Profile (ASP) may provide a list of storage requirements and attributes for a software application or system. Each requirement may be assigned a percentage weight such that a sum of the requirements' weights equals 100%. Each requirement's sub-requirements can also be assigned percentage weights that sum to 100%. Example requirements include:

Storage Array Requirements (SAR): Each sub-requirement typically may be assigned a percentage weight that sums to 100%. Below are examples of sub-requirements:

Storage Array Requirement: specifies whether the application is better suited for a particular make or model of array.

Storage Array ID(s) Requirement: enables a storage administrator to specify one or more Storage Array IDs for a particular application. A value of null typically indicates that the application has no storage array preferences.

Storage Type Requirement: specifies whether the application is better suited for file, block or cloud storage services.

Device Group Requirement (DGR): Each sub-requirement typically may be assigned a percentage weight that sums to 100%. Below are examples of sub-requirements:

Group Type Requirement: whether the application is better suited for RAID Groups, Traditional (Thick) Storage Pools, Virtual (Thin) Storage Pools, etc.

Storage Tier Requirement: whether the application is better suited for Tier 0, Tier 1, Tier 2, etc. storage.

Data Protection Policy: whether data protection is enabled for the Device Group.

Data Protection Policy Type: if enabled, the type of data protection that is enabled for the Device Group.

Storage Usage Descriptors: a user-definable tag that describes the application's use of storage. Example storage description tags include "Transactional Database," "Database Log," "Hypervisor Data Store," "SAP Application," etc.

Device Requirements (DR): Each sub-requirement typically may be assigned a percentage weight that sums to 100%. Below are examples of sub-requirements:

Device Type Requirement: whether the application is better suited for traditional hard disk drives, solid state drives, etc.

Estimated Average Data Transfer Rate: the estimated average data transfer rate required for the application.

Estimated Max Transfer Rate: the estimated maximum data transfer rate required for the application.

Estimated Maximum Disk Wait Time: the maximum amount of time that an application can wait for a disk to service a request.

Estimated Average Percentage Disk Write Time: the estimated average percentage of storage operations that will be "write" operations.

Estimated Average Percentage of Disk Read Time: the estimated average percentage of storage operations that will be "read" operations.

A Storage Resource Profile (SRP) may provide the physical and logical attributes of an organization's storage resources, including the arrays' device groups (RAID Groups, Storage Groups, etc.) and the physical properties of the physical disk drives of the array. While the attributes vary by array/group/device combination, an example set of ASP attributes includes:

Storage Array Attributes (SAA) such as, for example:
Storage Array Attribute: the make and model of array.
Storage Array ID: the serial number of the array.
Storage Type: whether the array supports file storage, block storage, or both.

Device Group Attributes (DGA) such as, for example:
Group Type Attribute: whether the Device Group is a RAID Group, Traditional (Thick) Storage Pool, Virtual (Thin) Storage Pool, etc.

Storage Tier Attribute: whether the Device Group supports Tier 0, Tier 1, Tier 2, etc. storage. In the case of Storage Pools, multiple Tiers may be supported.

Data Protection Attribute: whether data protection is enabled for the Device Group.

Data Protection Type: indication of the type of data protection policy that has been enabled for the device group.

Storage Tenants: list of Storage Usage Descriptors that have been allocated to a Device Group.

Device Attributes (DA) such as, for example:
Disk Type: hard disk drive, solid state disk drive, etc.
Average Disk Bytes Transfer Rate: number of bytes per disk transfer averaged over the previous 30-second interval.

Maximum Disk Bytes Transfer Rate: maximum of bytes per disk transfer recorded since the device was registered with the Storage Automator.

Average Wait: Average time waiting for disk access expressed in milliseconds.

Disk Busy Percentage: percentage of time a disk has been busy transferring data.

Percent Disk Read Time: percentage of elapsed time that the disk drive was busy servicing read requests over the previous 30-second interval.

Percent Disk Write Time: percentage of elapsed time that the disk drive was busy servicing write requests over the previous 30-second interval.

Storage Multitenancy Relationships (SMRs) provide a set of rules that define the relationships between Storage Usage Descriptors (SUDs). For example, a relationship state can be represented by an integer number from 1 to 10, where 1=not compatible and 10=highly compatible.

In certain embodiments, when allocating storage to a new application, the ISE 140 may compare the ASP requirements with the SRP attributes. If the SRP attribute meets or exceeds the ASP requirement, then the match is scored a Boolean "1." If the SRP attribute fails to meet the ASP requirement, it is scored a Boolean "0." Each score then may be multiplied by, for example its user defined weight, and then summed.

The following equation summarizes this example of the scoring algorithm.

$$S = \left(\sum_{i=1}^{n}((SARi \cap SAAi)*\text{SAR\_Wi})*\text{SAR\_W}\right) +$$
$$\left(\sum_{i=1}^{n}((DGRi \cap DGAi)*\text{DGR\_Wi})*\text{DGR\_W}\right) +$$
$$\left(\sum_{i=1}^{n}((DRi \cap DAi)*\text{DR\_Wi})*\text{DR\_W}\right) +$$
$$\left(\sum_{i=1}^{n}(SMR[SUDi] \cup ASP[SUDi])*\text{SMR\_W}\right)$$

It should be appreciated that, in various embodiments, the scoring algorithm above can be tuned or otherwise modified to suit particular implementations. It is also contemplated that other scoring algorithms could also be used without deviating from the inventive principles taught herein.

Application compatibility is typically handled separately. In the case of application compatibility, the SUDs assigned to each application (contained in the ASP) is compared to the list of SUDs contained in each Device Group's Storage Tenants Attribute. The relationship value for each SUD pairing is looked up in the SMR and summed. The ISE 140 may determine a compatibility of an application providing the request for storage with other applications to which storage resources are provisioned among the available storage resources (535). In various embodiments, the ISE 140 may be aware of both the applications that are currently consuming storage resources, as well as how they are consuming those resources. The ISE's 140 awareness of what has been deployed, combined with a scoring algorithm, in a typical embodiment enables the ISE 140 to avoid allocating storage on the same storage device to applications that are incompatible. For example, the ISE 140 rules engine can be configured so that storage for an Online Transaction Processing Database that performs a large number of sequential write operations would not be placed on the same array as an Offline Analytical Processing database that is performing several "disk seek" operations. This ability to avoid application conflicts is particularly important in multi-tenant environments, including cloud computing infrastructure.

It should be understood that Storage Administrators 185 may modify the parameters of these rules, to "tune" the rules for a particular storage environment, such as via an Administrator Portal 180 presented via a Storage Administration API 115. The Storage Administrator Portal 180 may provide a user interface for a Storage Administrator 185 to configure the Storage Automator 100 as well as the policies that define the automated storage services that the Storage Automator 100 provides, such as via the Storage Services API 105.

Figure 9:
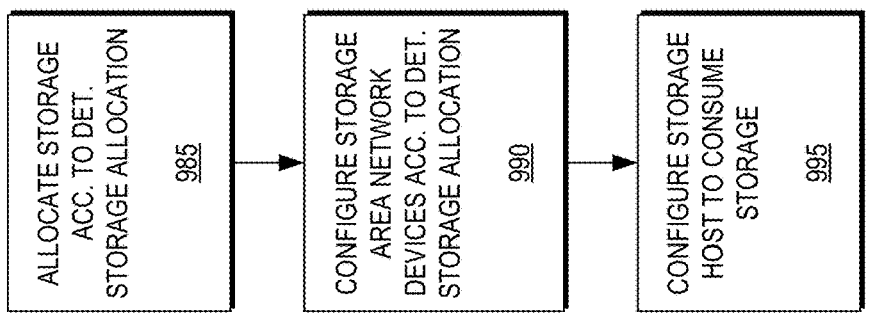

Returning to FIG. 2, the Storage Automator 100 then may provision storage (250) according to the determined storage allocation using the Storage Execution Engine (SEE) 145 which is a policy driven, workflow engine that manipulates the behavior of storage arrays, storage switches, storage hosts, etc. As illustrated in FIGS. 1 and 9, once a match is made between the Storage User's 175 storage requirements submitted in the request and the available storage as defined in the Data Store 155, the SEE 145 may allocate storage according to the determined storage allocation (985). Additionally, the SEE 145 may configure required storage area network devices/equipment according to the determined storage allocation for provisioning (990). In other embodiments, the SEE 145 also may configure a storage host to consume the storage allocated according to the determined storage allocation for provisioning (995). It should be understood that the SEE 145 drives the behavior of storage systems (including storage arrays, network devices, and hosts) through those systems' application programming interfaces (APIs), command-line interfaces (CLIs) or any other mechanism that enables operations to be effected on those systems.

One aspect of the Storage Execution Engine 145 is represented by Storage Execution Plans. Storage Execution Plans are typically documents such as, for example, XML documents, that enable Storage Administrators 185 to (1) define storage provisioning workflows, (2) build "preview" workflows to perform checks in a storage environment before executing an automated service, and (3) provide recovery logic, enabling storage administrators to perform a series of actions to cover from a failed automated storage service (and return the storage equipment to their last known good state).

In a typical embodiment, Storage Execution Plans enable Storage Administrators 185 to manipulate the multi-stepped workflows required to execute automated storage services without having to edit the workflows themselves. Storage Administrators 185 can edit the Storage Execution Plans via, for example, a text editor, XML editor or via the Storage Automator's 100 Administrator Portal 180. Storage Execution Plans may be stored in the Data Store 155.

Figure 8:
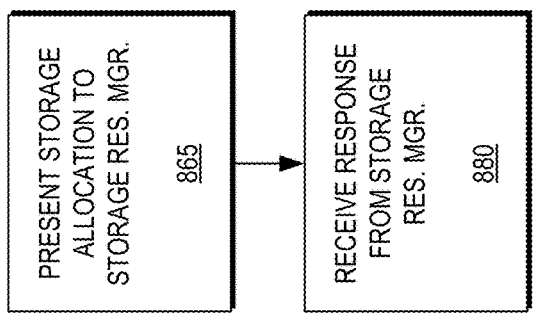
Figure 7:
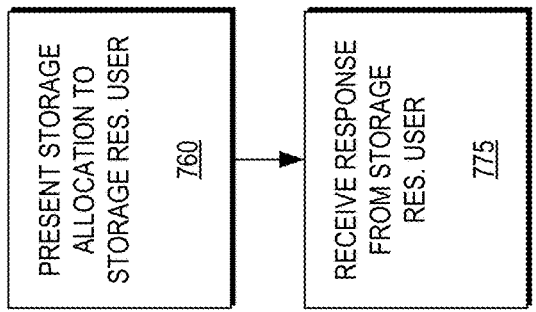
Figure 6:
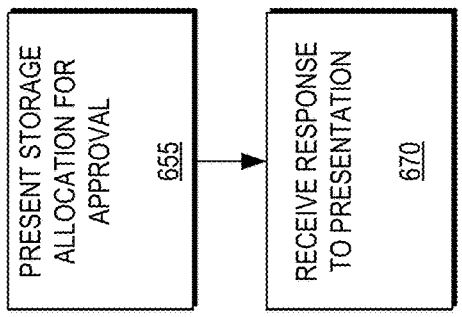

In certain embodiments, as illustrated in FIGS. 6-8, Storage User 175 and/or Storage Administrator 185 approval of a storage allocation may be necessary. As illustrated in FIG. 1, a Change Approval Facility 150 may provide an automated change management system that enables Storage Users 175 and Storage Administrators 185 to review and approve requests for automated storage services, such as storage provisioning. As illustrated in FIG. 6, the ISE 140 may present the storage allocation determined for provisioning according to the request for storage and available storage resources for approval (655) and receive a response to the presentation (670).

As illustrated in FIG. 7, the ISE 140 may present to the Storage User 175 for approval, via the Storage Services API 105, the storage allocation determined for provisioning according to the request for storage and available storage resources (760). The ISE 140 then may, for example via the Storage Services API 105, receive a response from the Storage User 175 either approving or rejecting the storage allocation determined for provisioning according to the request for storage and available storage resources (775).

Alternatively, or in addition thereto, as illustrated in FIG. 8, the ISE 140 may present to the Storage Administrator 185, via the Storage Administration API 115, the storage allocation determined for provisioning according to the request for storage and available storage resources (865). The ISE 140 then may, for example via the Storage Administration API 115, receive a response from the Storage Administrator 185 either approving or rejecting the storage allocation determined for provisioning according to the request for storage and available storage resources (880).

Figure 10:
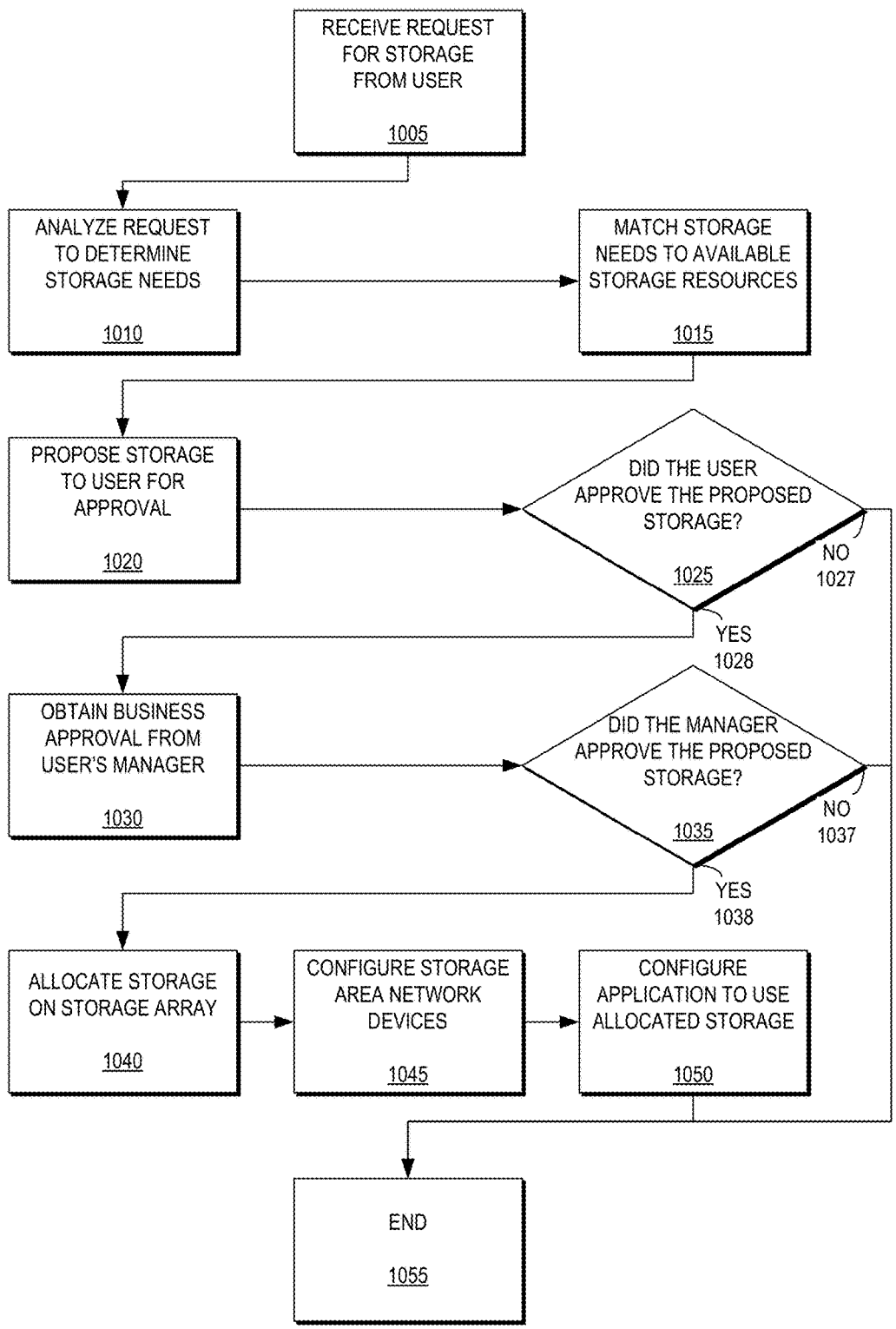
FIG. 10 is a flow diagram illustrating provisioning of storage according to an example embodiment of the present invention.

FIG. 10 is a flow diagram illustrating provisioning of storage according to an example embodiment of the present invention. As illustrated in FIGS. 1 and 10, the Storage Automator 100 may receive a request for storage from a Storage User 175 (1005), such as via the User Portal/Services Catalog 170 and the Storage Services API 105. The Intelligent Storage Engine 140 then may analyze the request for storage to determine storage needs (1010) and match the storage needs to available storage resource (1015) (e.g., as defined by the Storage Discovery Engine 120 and stored in the Data Store 155).

The Change Approval Facility 150 then may, via the Storage Services API 105 and the User Portal 170, propose (e.g., present) the storage to the Storage User 175 for approval (1020). The Change Approval Facility 150 then may determine, such as via the Storage Services API 105 and the User Portal 170 whether the Storage User 175 approved the proposed storage (1025). If the Storage User 175 did not approve the proposed storage (1027), then the method ends (1055). However, if the Storage User 175 did approve the proposed storage (1028), then the method continues.

The Change Approval Facility 150 then may, via the Storage Administration API 115 and the Administrator Portal 180, obtain business approval from a Storage Administrator 185 (e.g., the Storage User's 175 manager) (1030). The Change Approval Facility 150 then may determine, such as via the Storage Administration API 115 and the Administrator Portal 180 whether the Storage Administrator 185 approved the proposed storage (1035). If the Storage Administrator 185 did not approve the proposed storage (1037), then the method ends (1055). However, if the Storage Administrator 185 did approve the proposed storage (1038), then the method continues.

The Storage Execution Engine 145 then may allocate storage on a storage array (1040) according to the determined storage allocation, configure storage area network devices (1045) according to the determined storage allocation for provisioning, and configure an application to use the allocated storage (1050) according to the determined storage allocation for provisioning. The method then ends (1055).

While Intelligent Storage Engine 140 rules may be expressed in any rules engine, in various embodiments the rules can be implemented, for example, as Drools rules. An example, simple Drools rule to select an array based on percent utilization is provided below:

```
# Function to calculate % utilization
function double calcArrayUtil(long size, long free) {
    double util=((double)free/(double)size)*100;
    return Math.floor(util);
}
# Function that determines the least Utilized Array in a
    given list function Array getLeastUtilizedArray(java.u-
    til.List arrays) {
    Array leastUtilArray=null;
    for(Object o: arrays) {
        Array a=(Array)o;
        double util=100-calcArrayUtil(a.getSize( ), a.get-
            Free( ));
        a. setUtilization(util);
        if (leastUtilArray==null) {
            leastUtilArray=a;
        } else if(leastUtilArray !=null &&
        leastUtilArray.getUtilization( )>a.getUtilization( ) {
            leastUtilArray=a;
        }
    }
    return leastUtilArray;
}
# Compare a List of Arrays and determine which one
    should be used
rule "Find Least Utilized Array"
no-loop
when
$ac: ArrayChooser(arrays.size>0)
then
Array array=getLeastUtilizedArray($ac.getArrays( ));
$ac.setChosenArray(array);
update($ac);
end
```

Storage Execution Plans interact with ISE 140 to perform storage selection. ISE 140 also provides the policies that determine how Storage Execution Plans handle execution preview, rollback and scheduling for all storage provisioning workflows.

1. A sample execution plan is provided below:

```
<bean id="VMAXe-AddStorageExistingServer"
class="com.product.provision.plan.ExecutionPlan">
    <property name="operation" value="VMAXe Add Storage to an Existing Server" />
    <property name="preconditionChecks">
        <list>
            <ref bean="SymCli-CanConnectToCLI" />
            <ref bean="SymCli-StorageArrayAvailable" />
            <ref bean="SymCli-StroageGroupExists" />
        </list>
    </property>
    <property name="executionCommands">
        <list>
            <ref bean="SymCli-CreateDevices" />
            <ref bean="SymCli-FormMetaDevices" />
            <ref bean="SymCli-AddDeviceToStorageGroup" />
        </list>
    </property>
    <property name="rollbackCommands">
        <list>
            <ref bean="SymCli-DeleteStorageGroup" />
            <ref bean="SymCli-DeletePortGroup" />
            <ref bean="SymCli-DeleteInitiatorGroup" />
            <ref bean="SymCli-RemoveFromInitiatorGroup" />
            <ref bean="SymCli-DeleteMaskingView" />
        </list>
    </property>
</bean>
```

2. Execution Plan for a Service

```
<bean id="SymCli-FormMetaDevices"
class="com.product.provision.command.ExecutionCommand">
    <property name="type" value="SymCli" />
    <property name="identifier" value="FormMetaDevices" />
    <property name="name" value="Form Meta Device" />
    <property name="cli" value="symconfigure -sid {0} -cmd "form meta from dev {1}, config={2}; {3} " commit -nop" />
    <property name="argNames">
        <list>
            <value>sid</value>
            <value>metaDevice</value>
            <value>metaType</value>
            <value>addHyperDevicesToMeta</value>
        </list>
    </property>
</bean>
```

Figure 11:
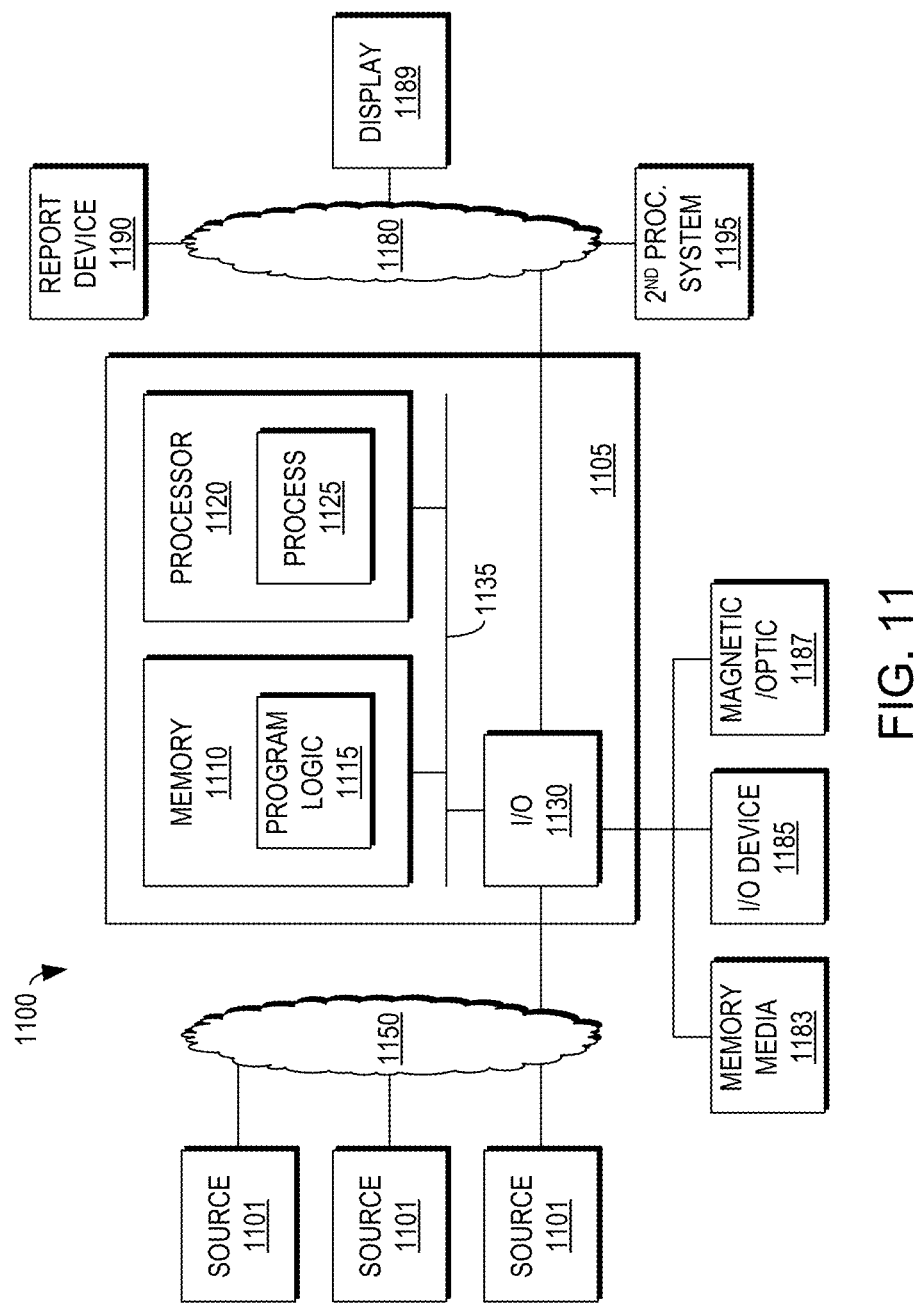
FIG. 11 is a block diagram illustrating an apparatus according to an example embodiment of the present invention.

FIG. 11 is a block diagram of an example embodiment apparatus 1105 according to the present invention. The apparatus 1105 may be part of a system 1100 and includes memory 1110 storing program logic 1115, a processor 1120 for executing a process 1125, and a communications I/O interface 1130, connected via a bus 1135.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 12:
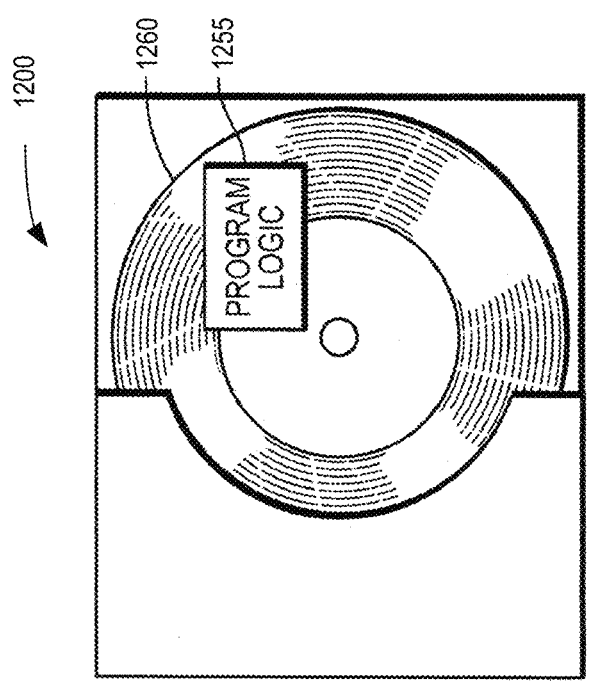
FIG. 12 is an illustration of an apparatus as embodied in program code according to an example embodiment of the present invention.

FIG. 12 shows program logic 1255 embodied on a computer-readable medium 1260 as shown, and wherein the logic 1255 is encoded in computer-executable code configured for carrying out the gas controlling process of this invention, thereby forming a computer program product 1200.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
    receiving a request for storage from a storage user, the storage request comprising an application storage profile specifying one or more storage requirements and attributes for a given application, the one or more storage requirements and attributes comprising a first set of storage usage descriptors comprising tags describing use of one or more storage resources by the given application;
    determining storage resource profiles according to storage resources residing in a plurality of tenant data centers each comprising at least one data storage system, the storage resource profiles comprising physical and logical attributes of the storage resources in the plurality of tenant data centers, the physical and logical attributes comprising a second set of storage usage descriptors, the second set of storage usage descriptors comprising tags describing use of one or more of the storage resources residing in the plurality of tenant data centers by applications running in the plurality of tenant data centers;
    classifying the storage resources residing in the plurality of tenant data centers according to the physical and logical attributes of the storage resources;
    determining a storage allocation for provisioning from available storage resources in at least two tenant data centers of the plurality of tenant data centers having storage resource profiles satisfying the application storage profile for the request for storage according to a scoring algorithm for evaluating the request for storage, the scoring algorithm being utilized to evaluate storage resource compatibility of the given application with one or more of the applications running in the plurality of data centers based at least in part on storage multitenancy relationship values determined from a comparison of at least a portion of the first set of storage usage descriptors for the given application with at least a portion of the second set of storage usage descriptors for the applications running in the plurality of data centers; and
    provisioning storage at the at least two tenant data centers of the plurality of tenant data centers according to the determined storage allocation;
    wherein the storage multitenancy relationship values characterize compatibility of types of input/output (I/O) operations performed by the given application with types of I/O operations performed by the applications running in the plurality of tenant data centers;
    wherein the scoring algorithm is used to compute a score for each of the at least two tenant data centers based on the storage multitenancy relationship values; and
    wherein determining the storage allocation comprises selecting one or more of the at least two tenant data centers for provisioning the storage request based on the computed scores.

2. The method of claim 1 wherein determining a storage allocation for provisioning from available storage resources in at least two tenant data centers having storage resource profiles satisfying an application storage profile for the request for storage according to a scoring algorithm for evaluating the request for storage comprises:
    analyzing the request for storage to determine a desired storage allocation satisfying the request for storage;
    analyzing a data store including information defining the available storage resources; and
    matching the desired storage allocation satisfying the request against the available storage resources.

3. The method of claim 2:
    wherein analyzing the request for storage to determine a desired storage allocation satisfying the request for storage comprises determining attributes and characteristics of the desired storage allocation satisfying the request for storage;
    wherein analyzing a data store including information defining the available storage resources comprises determining attributes and characteristics of the available storage resources defined in the data store; and
    wherein matching the desired storage allocation satisfying the request against the available storage resources comprises selecting storage resources for provisioning having attributes and characteristics most consistent with the attributes and characteristics of the desired storage allocation satisfying the request for storage.

4. The method of claim 2 further comprising:
    presenting for approval the storage allocation determined for provisioning according to the request for storage and available storage resources; and
    receiving a response to the presentation.

5. The method of claim 4:
    wherein presenting for approval the storage allocation determined for provisioning according to the request for storage and available storage resources comprises presenting to a storage resource user for approval the storage allocation determined for provisioning according to the request for storage and available storage resources; and
    wherein receiving a response to the presentation comprises receiving a response to the presentation from the storage resource user.

6. The method of claim 4:
    wherein presenting for approval the storage allocation determined for provisioning according to the request for storage and available storage resources comprises presenting to a storage resource manager for approval the storage allocation determined for provisioning according to the request for storage and available storage resources; and
    wherein receiving a response to the presentation comprises receiving a response to the presentation from the storage resource manager.

7. The method of claim 1 wherein provisioning storage at the at least two tenant data centers according to the determined storage allocation comprises allocating the storage according to the determined storage allocation.

8. The method of claim 7 further comprising configuring storage area network devices according to the determined storage allocation for provisioning.

9. The method of claim 8 further comprising configuring a storage host to consume the storage allocated according to the determined storage allocation for provisioning.

10. The method of claim 1 wherein the application storage profile comprises a set of storage array requirements, a set of device group requirements and a set of device requirements.

11. The method of claim 10 wherein the first set of storage usage descriptors comprises a portion of the set of device group requirements in the application storage profile.

12. A system comprising:
an interface configured to receive a request for storage from a storage user, the storage request comprising an application storage profile specifying one or more storage requirements and attributes for a given application, the one or more storage requirements and attributes comprising a first set of storage usage descriptors comprising tags describing use of one or more storage resources by the given application; and
a storage automation engine configured:
to determine storage resource profiles according to storage resources residing in a plurality of tenant data centers each comprising at least one data storage system, the storage resource profiles comprising physical and logical attributes of the storage resources in the plurality of tenant data centers, the physical and logical attributes comprising a second set of storage usage descriptors, the second set of storage usage descriptors comprising tags describing use of one or more of the storage resources residing in the plurality of tenant data centers by applications running in the plurality of tenant data centers;
to classify the storage resources residing in the plurality of tenant data centers according to the physical and logical attributes of the storage resources;
to determine a storage allocation for provisioning from available storage resources in at least two tenant data centers of the plurality of tenant data centers having storage resource profiles satisfying the application storage profile for the request for storage according to a scoring algorithm for evaluating the request for storage, the scoring algorithm being utilized to evaluate storage resource compatibility of the given application with one or more of the applications running in the plurality of data centers based at least in part on storage multitenancy relationship values determined from a comparison of at least a portion of the first set of storage usage descriptors for the given application with at least a portion of the second set of storage usage descriptors for the applications running in the plurality of data centers; and
to provision storage at the at least two tenant data centers of the plurality of tenant data centers according to the determined storage allocation;
wherein the storage multitenancy relationship values characterize compatibility of types of input/output (I/O) operations performed by the given application with types of I/O operations performed by the applications running in the plurality of tenant data centers;
wherein the scoring algorithm is used to compute a score for each of the at least two tenant data centers based on the storage multitenancy relationship values; and
wherein determining the storage allocation comprises selecting one or more of the at least two tenant data centers for provisioning the storage request based on the computed scores.

13. The system of claim 12 wherein the storage automation engine comprises an intelligent storage engine configured:
to analyze the request for storage to determine a desired storage allocation satisfying the request for storage;
to analyze a data store including information defining the available storage resources; and
to match the desired storage allocation satisfying the request against the available storage resources.

14. The system of claim 13 wherein the intelligent storage engine is further configured:
to determine attributes and characteristics of the desired storage allocation satisfying the request for storage;
to determine attributes and characteristics of the available storage resources defined in the data store; and
to select storage resources for provisioning having attributes and characteristics most consistent with the attributes and characteristics of the desired storage allocation satisfying the request for storage.

15. The system of claim 13 further comprising a change approval facility configured:
to present for approval the storage allocation determined for provisioning according to the request for storage and available storage resources; and
to receive a response to the presentation.

16. The system of claim 15 wherein the change approval facility is configured:
to present to a storage resource user via a user portal for approval the storage allocation determined for provisioning according to the request for storage and available storage resources; and
to receive a response to the presentation from the storage resource user.

17. The system of claim 15 wherein the change approval facility is configured:
to present to a storage resource administrator via an administrator portal for approval the storage allocation determined for provisioning according to the request for storage and available storage resources; and
to receive a response to the presentation from the storage resource manager.

18. The system of claim 12 wherein the storage automation engine further comprises a storage execution engine configured to allocate the storage according to the determined storage allocation.

19. The system of claim 18 wherein the storage execution engine is further configured to configure storage area network devices according to the determined storage allocation for provisioning.

20. The system of claim 19 wherein the storage execution engine is further configured to configure a storage host to consume the storage allocated according to the determined storage allocation for provisioning.

21. A computer program product including a non-transitory computer-readable storage medium encoded with computer program code that, when executed on a processor of a computer, causes the computer to provision storage, the computer program product comprising:
computer program code for receiving a request for storage from a storage user, the storage request comprising an application storage profile specifying one or more storage requirements and attributes for a given application, the one or more storage requirements and attributes comprising a first set of storage usage descriptors comprising tags describing use of one or more storage resources by the given application;
computer program code for determining storage resource profiles according to storage resources residing in a plurality of tenant data centers each comprising at least one data storage system, the storage resource profiles comprising physical and logical attributes of the storage resources in the plurality of tenant data centers, the physical and logical attributes comprising a second set of storage usage descriptors, the second set of storage usage descriptors comprising tags describing use of one or more of the storage resources residing in the plurality of tenant data centers by applications running in the plurality of tenant data centers;

computer program code for classifying the storage resources residing in the plurality of tenant data centers according to the physical and logical attributes of the storage resources;

computer program code for determining a storage allocation for provisioning from available storage resources in at least two tenant data centers of the plurality of tenant data centers having storage resource profiles satisfying the application storage profile for the request for storage according to a scoring algorithm for evaluating the request for storage, the scoring algorithm being utilized to evaluate storage resource compatibility of the given application with one or more of the applications running in the plurality of data centers based at least in part on storage multitenancy relationship values determined from a comparison of at least a portion of the first set of storage usage descriptors for the given application with at least a portion of the second set of storage usage descriptors for the applications running in the plurality of data centers; and computer program code for provisioning storage at the at least two tenant data centers of the plurality of tenant data centers according to the determined storage allocation;

wherein the storage multitenancy relationship values characterize compatibility of types of input/output (I/O) operations performed by the given application with types of I/O operations performed by the applications running in the plurality of tenant data centers; and wherein the scoring algorithm is used to compute a score for each of the at least two tenant data centers based on the storage multitenancy relationship values; and wherein determining the storage allocation comprises selecting one or more of the at least two tenant data centers for provisioning the storage request based on the computed scores.

* * * * *